(12) United States Patent
Doi et al.

(10) Patent No.: US 7,195,816 B2
(45) Date of Patent: Mar. 27, 2007

(54) ACRYLIC FILM AND LAMINATES COMPRISING THE SAME

(75) Inventors: Norito Doi, Takasago (JP); Takao Shibata, Himeji (JP); Yoichi Matsumura, Takasago (JP); Shigemi Matsumoto, Akashi (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/531,282

(22) PCT Filed: Dec. 19, 2002

(86) PCT No.: PCT/JP02/13279

§ 371 (c)(1),
(2), (4) Date: Oct. 13, 2005

(87) PCT Pub. No.: WO2004/035683

PCT Pub. Date: Apr. 29, 2004

(65) Prior Publication Data

US 2006/0110592 A1  May 25, 2006

(30) Foreign Application Priority Data

Oct. 15, 2002 (JP) .............................. 2002-300664
Oct. 15, 2002 (JP) .............................. 2002-300665

(51) Int. Cl.
*B32B 5/16* (2006.01)
*B32B 27/30* (2006.01)
*C08G 63/48* (2006.01)
*C08L 31/02* (2006.01)
*C08L 33/06* (2006.01)

(52) U.S. Cl. ..................... 428/327.5; 428/522; 525/70; 525/80; 525/222; 525/227

(58) Field of Classification Search ................ 428/220, 428/327, 521, 522; 525/70, 80, 191, 222, 525/227

See application file for complete search history.

(56) References Cited

U.S. PATENT DOCUMENTS 3,988,392 A * 10/1976 Kameda et al. ................ 525/85
5,169,903 A * 12/1992 Toritani et al. ............. 525/310
6,309,739 B1 * 10/2001 Koizumi et al. ............ 428/220

FOREIGN PATENT DOCUMENTS

| JP | 51-24689 A | | 2/1976 |
|---|---|---|---|
| JP | 6-248035 A | | 9/1994 |
| JP | 10306192 | * | 11/1996 |
| JP | 10-25321 A | | 1/1998 |
| JP | 11-71437 A | | 3/1999 |
| JP | 2001-31832 A | | 2/2001 |
| JP | 2001-59048 A | | 3/2001 |
| JP | 2002-20571 A | | 1/2002 |
| JP | 2001220115 | * | 3/2003 |
| JP | 3539973 | * | 7/2004 |
| WO | 02085620 | * | 10/2002 |

* cited by examiner

Primary Examiner—Kevin R. Kruer
(74) Attorney, Agent, or Firm—Sughrue Mion, PLLC

(57) ABSTRACT

To provide an acrylic film, composed of a resin composition (C) that includes an acrylic graft copolymer (A) containing an acrylic ester rubber-like polymer and a methacrylic polymer (B) containing 80% by weight or more of methyl methacrylate, wherein (1) the content of the acrylic ester rubber-like polymer in the resin composition (C) is 5% by weight or more and 30% by weight or less, (2) the average particle size of the acrylic ester rubber-like polymer is 500 to 2000 Å, (3) the relationship between the average particle size d (Å) of the acrylic ester rubber-like polymer and the amount w (% by weight) of crosslinking agent used in the acrylic ester rubber-like polymer satisfies the following equation: $0.002d \leq w \leq 0.005d$, (4) the graft ratio of the acrylic graft copolymer (A) is 30% or more and 200% or less, and (5) the reduced viscosity of methyl ethyl ketone soluble matter in the resin composition (C) is 0.2 to 0.8 dl/g.

6 Claims, No Drawings

ACRYLIC FILM AND LAMINATES COMPRISING THE SAME

This application is a national phase patent application of PCT/JP2002/013279 filed on Dec. 19, 2002, claiming priorities of Japanese patent application No. 2002-300664 filed on Oct. 15, 2002 and Japanese patent application No. 2002-300665 filed Oct. 15, 2002.

TECHNICAL FIELD

The present invention relates to a special acrylic film and an acrylic film laminate, in particular to an acrylic film laminate produced by injection molding.

BACKGROUND ART

Methods for decoration of the surface of plastic or metal parts include, for example, a direct printing process and a decalcomania process. However, the direct printing process has a problem of being unsuitable for molded products having a complex shape, whereas the decalcomania process has a problem of being costly. In the meantime, there are methods for decoration of the surface of plastic or metal products at low costs: for example, a film insert molding process in which a base resin is injection molded while a film of acrylic resin etc. having been shaped by vacuum forming in advance is inserted into a cavity of an injection molding die; and a film in-mold molding process in which a base resin is injection molded while a film having not been shaped is inserted into a cavity of an injection molding die. And there have been proposed various methods for producing acrylic films suitable for this application. For example, there are known a method in which the reduced viscosity of plastic polymer, the particle size of rubber-containing polymer, the rubber content etc. are specified (Japanese Patent Laid-Open No. 8-323934) and a method in which the reduced viscosity of acrylic polymer and the content of multi-layer structure acrylic polymer are specified (Japanese Patent Laid-Open Nos. 10-279766 and 10-306192). The films produced by these methods are known to excel in surface hardness, transparency and moldability. However, these patent specifications do not describe the problem of stress-whitening occurring in the films or cracks occurring at the time of film cutting.

For the problem of stress-whitening occurring in films, Japanese Patent Laid-Open No. 2002-80678 states that the problem can be solved by specifying the particle size of rubber-like polymer used to be less than 2000 Å. In this document, vacuum forming is performed at pre-heating temperatures as relatively high as 125 to 145° C.; however, some of the films described in the document undergoes stress-whitening at pre-heating temperature of 125° C. or 130° C. Stress-whitening is more likely to occur at lower heating temperatures, and even by the method described in this document, a film is hard to form by vacuum forming at temperatures lower than the above described temperatures. This document does not mention at all the problem of cracks occurring in a film when cutting the molding flash at the end portion of the film at finishing step. Specifically, in any one of these films, when laminating the film on a molded product of a complex shape at low temperatures, stress is concentrated in the corner of the film, and the film is likely to undergo whitening, resulting in significant deterioration of its value as a product. These films also have a problem of cracks caused when cutting at a finishing step the molding flash at the end portion of the film laminates obtained by a film insert molding process or film in-mold molding process.

Under these circumstances, the present inventors directed tremendous research efforts toward the development of a film in which stress-whitening hardly occur even by molding at low temperatures and cracks hardly occur at the time of cutting of the film. And they have found that a film, composed of a resin composition that includes a multi-layer structure acrylic polymer using a special acrylic ester rubber-like polymer and a methacrylic polymer, undergoes less stress-whitening even by molding at low temperatures and has high surface hardness, excellent transparency, also excellent transparency even after heating and excellent weatherability, and its elongation at the time of tensile breakage is high and its moldability, surface properties and processability (cracks are less likely to occur at the time of film cutting) are all excellent.

DISCLOSURE OF THE INVENTION

The present invention relates to an acrylic film composed of a resin composition (C) that includes an acrylic graft copolymer (A) containing an acrylic ester rubber-like polymer and a methacrylic polymer (B) containing 80% by weight or more of methyl methacrylate, wherein (1) the content of the acrylic ester rubber-like polymer in the resin composition (C) is 5% by weight or more and 30% by weight or less, (2) the average particle size of the acrylic ester rubber-like polymer is 500 to 2000 Å, (3) the relationship between the average particle size d (Å) of the acrylic ester rubber-like polymer and the amount w (% by weight) of a crosslinking agent used in the acrylic ester rubber-like polymer satisfies the following equation:

$$0.002d \leq w \leq 0.005d,$$

(4) the graft ratio of the acrylic graft copolymer (A) is 30% or more and 200% or less, and (5) the reduced viscosity of methyl ethyl ketone soluble matter in the resin composition (C) is 0.2 to 0.8 dl/g.

Preferably, the relationship between the average particle size d (Å) of the acrylic ester rubber-like polymer and the amount w (% by weight) of the crosslinking agent used in the acrylic ester rubber-like polymer satisfies the following equation:

$$0.0025d \leq w \leq 0.005d.$$

More preferably, the content of the acrylic ester rubber-like polymer in the resin composition (C) is 15% by weight or more and 30% by weight or less.

Furthermore preferably, the content of the acrylic ester rubber-like polymer in the resin composition (C) is more than 20% by weight and 30% by weight or less.

Preferably, the acrylic graft copolymer (A) is prepared by: graft polymerizing a monomer mixture containing 86% by weight or more of a methacrylic ester onto the acrylic ester rubber-like polymer in a first step; and graft polymerizing a monomer mixture containing 85% by weight or less of a methacrylic ester onto the resultant graft polymer in a second step.

The present invention also relates to a laminate of the above acrylic film.

Preferably, the above laminate is produced by injection molding.

BEST MODE FOR CARRYING OUT THE INVENTION

The resin composition (C) used in the present invention includes an acrylic graft copolymer (A) containing an acrylic ester rubber-like polymer and a methacrylic polymer (B) containing 80% by weight or more of methyl methacrylate. The resin composition (C) can be obtained by first polymerizing the acrylic graft copolymer (A) and the methacrylic polymer (B), separately, and then mixing the copolymer and the polymer. The preparation of these copolymer and polymer can be carried out in the same reactor in such a manner as to first prepare the acrylic graft copolymer (A) and subsequently prepare the methacrylic polymer (B). The copolymer (A) and the polymer (B) can be mixed in the form of latex, powder, beads or pellets.

The acrylic graft copolymer (A) used in the present invention is obtained by polymerizing a monomer mixture containing a methacrylic ester as a chief ingredient in the presence of an acrylic ester rubber-like polymer (a cross linked rubber-like polymer containing acrylic ester as a chief ingredient).

The acrylic graft copolymer (A) used in the present invention can also be obtained by graft polymerizing a monomer mixture containing 86% by weight or more of a methacrylic ester in a first step and then graft polymerizing a monomer mixture containing 85% or less of a methacrylic ester in a second step, in the presence of an acrylic ester rubber-like polymer.

The acrylic ester rubber-like polymer in the acrylic graft copolymer is prepared by polymerizing a monomer mixture including: 60 to 99% by weight of an acrylic ester; 0 to 30% by weight of another copolymerizable vinyl monomer and a specific amount of a copolymerizable crosslinking agent. This preparation may be carried out by mixing all the monomers or carried out in two or more steps while varying the monomer composition.

As the acrylic ester used, those having 1 to 12 carbon atoms in the alkyl group are preferable from the viewpoint of polymerizability and cost. Concrete examples of such acrylic esters include: methyl acrylate, ethyl acrylate, propyl acrylate, butyl acrylate, 2-ethylhexyl acrylate and n-octyl acrylate. These monomers may be used alone or in combination.

The content of the acrylic ester in the acrylic ester rubber-like polymer is preferably 60 to 99% by weight, more preferably 70 to 99% by weight, much more preferably 80 to 99% by weight and most preferably 85 to 99% by weight. If the content is less than 60% by weight, the impact resistance tends to deteriorate, the elongation at the time of tensile breakage also tends to be lowered, and cracks tend to occur at the time of film cutting, whereas if the content is more than 99% by weight, the pencil hardness and transparency of the resultant film tend to be lowered.

As the other copolymerizable vinyl monomer, methacrylic esters are particularly preferable from the viewpoint of weathering resistance and transparency. Concrete examples of methacrylic esters include methyl methacrylate, ethyl methacrylate, propyl methacrylate and butyl methacrylate. Aromatic vinyls (e.g. styrene, methylstyrene, etc.) and vinyl cyanideds (e.g. acrylonitrile, methacrylonitrile, etc.) are also preferable. These monomers may be used alone or in combination.

The content of the other copolymerizable vinyl monomer in the acrylic ester rubber-like polymer is preferably 0 to 30% by weight and more preferably 0 to 15% by weight. If the content is more than 30% by weight, the moldability, processability, transparency and surface properties of the film tend to deteriorate.

As the copolymerizable crosslinking agent, conventional one maybe used. Concrete examples of such crosslinking agents include allyl methacrylate, allyl acrylate, triallyl cyanurate, triallyl isocyanurate, diallyl phthalate, diallyl malate, divinyl adipate, divinyl benzene, ethylene glycol dimethacrylate, diethylene glycol methacrylate, triethylene glycol dimethacrylate, trimethylolpropane trimethacrylate, tetramethylolmethane tetramethacrylate, dipropylene glycol dimethacrylate and the acrylates thereof. These crosslinking agents may be used alone or in combination.

The content of the copolymerizable crosslinking agent in the acrylic ester rubber-like polymer largely affects the average particle size of the acrylic ester rubber-like polymer and the stress-whitening, elongation at the time of tensile breakage and transparency of the film. Accordingly, it is important that the average particle size d (Å) of the acrylic ester rubber-like polymer and the content of the crosslinking agent w (% by weight) satisfy the following equation:

$$0.002d \leq w \leq 0.005d.$$

The minimum of the average particle size of the acrylic ester rubber-like polymer is preferably 500 Å and more preferably 600 Å. The maximum of the same is 2000 Å, preferably 1800 Å, more preferably 1600 Å, much more preferably 1500 Å, and further more preferably 1200 Å. If the average particle size is less than 500 Å, the impact resistance and elongation at the time of tensile breakage of the film tend to deteriorate and cracks tend to occur at the time of film cutting, whereas if the average particle size is more than 2000 Å, stress-whitening tends to occur in the resultant film, the transparency of the film tend to be lowered, and the transparency of the film after vacuum forming also tends to be lowered.

The content of the crosslinking agent is preferably in the range shown by the above equation, more preferably $0.0025d \leq w \leq 0.005d$ and much more preferably $0.0025d \leq w \leq 0.0045d$. If the relationship between the content w of the crosslinking agent and the average particle size d of the acrylic ester rubber-like polymer is in the range of $0.002d > w$ or $w > 0.005d$, stress-whitening tends to occur, the impact resistance and transparency of the film tend to deteriorate, the elongation at the time of tensile breakage tends to be lowered, cracks tend to occur at the time of film cutting, and the processability of the film tends to deteriorate.

The acrylic graft copolymer (A) used in the present invention is obtained by polymerizing a monomer mixture containing a methacrylic ester as a chief ingredient in the presence of the above described rubber-like polymer. Preferably, the acrylic graft copolymer (A) is obtained by polymerizing 95 to 25 parts by weight of a monomer mixture containing a methacrylic ester as a chief ingredient in the presence of 5 to 75 parts by weight of an acrylic ester rubber-like polymer in one or more steps. The content of the methacrylic ester in the graft copolymer composition (monomer mixture) is preferably 50% by weight or more and more preferably 60% by weight or more. If the content is less than 50% by weight, the hardness and stiffness of the resultant film tend to deteriorate.

The monomers used in the graft copolymerization include methacrylic esters and acrylic esters. And concrete examples of such monomers include those used in the above described acrylic ester rubber-like polymer. These monomers may be used alone or in combination.

When intending to obtain the acrylic graft copolymer (A) is to be obtained by graft polymerization in two steps, the monomer mixture containing 86% by weight or more of a methacrylic ester is graft polymerized in the presence of the above described acrylic ester rubber-like polymer in the first step and the monomer mixture containing 85% by weight or less of a methacrylic ester is graft polymerized in the second step.

The content of the methacrylic ester in the monomer mixture graft polymerized in the first step is preferably 86% by weight or more, more preferably 88% by weight or more and most preferably 90% by weight or more. The content of the methacrylic ester in the monomer mixture graft polymerized in the second step is preferably 85% by weight or less, more preferably 83% by weight or less and most preferably 80% by weight or less. If the content of the methacrylic ester in the monomer mixture graft polymerized in the first step is less than 86% by weight and that of the methacrylic ester in the monomer mixture graft polymerized in the second step is more than 85% by weight, stress-whitening is more likely to occur, and therefore the contents in such ranges are not preferable.

Preferably, the acrylic graft copolymer (A) is obtained by polymerizing 95 to 25 parts by weight of the monomer mixture containing a methacrylic ester as a chief ingredient in the presence of 5 to 75 parts by weight of the acrylic ester rubber-like polymer in two or more steps. The content of the monomer mixture polymerized in the presence of 5 to 75 parts by weight of the acrylic ester rubber-like polymer is preferably 90 to 5 parts by weight in each of the first and second steps and more preferably 85 to 10 parts by weight in each of the first and second steps. If the amount is outside the above range, the transparency, pencil hardness, moldability and processability of the film tend to deteriorate. The content of a methacrylic ester in the graft copolymer composition (monomer mixture) is preferably 50% by weight or more and more preferably 60% by weight or more. If the content is less than 50% by weight, the hardness and stiffness of the resultant film tend to deteriorate.

When polymerizing the monomer mixture containing a methacrylic ester as a chief ingredient onto the acrylic ester rubber-like polymer, some of the monomer mixture does not undergo graft reaction with the acrylic ester rubber-like polymer to produce an un-grafted polymer component. This component constitutes the whole or part of the methacrylic polymer (B). The graft copolymer is not dissolved in methyl ethyl ketone. The lower limit of the graft ratio to the acrylic ester rubber-like polymer is 30%, preferably 50% and more preferably 80%. The upper limit of the graft ratio is 200% and preferably 150%. If the graft ratio is less than 30%, the transparency of the film and the elongation at the time of tensile breakage of the film tend to be lowered and cracks tend to occur at the time of film cutting, whereas if the graft ratio is more than 200%, the melting viscosity at the time of film molding becomes high and the moldability of the film tends to deteriorate.

The methacrylic polymer (B) used in the present invention contains methyl methacrylate as a polymerizable ingredient. The content of methyl methacrylate is 80% by weight or more, preferably 90% by weight or more and more preferably 92% by weight or more. If the content of methyl methacrylate is less than 80%, the hardness and stiffness of the resultant film tends to deteriorate.

The lower limit of the content of the acrylic ester rubber-like polymer in the resin composition (C) used in the present invention is preferably 5% by weight, more preferably 10% by weight, much more preferably 15% by weight and most preferably more than 20% by weight. The upper limit of the content is preferably 30% by weight, more preferably 25% by weight and most preferably 23% by weight. If the content is less than 5% by weight, the elongation at the time of tensile breakage of the film tends to be lowered, cracks are more likely to occur at the time of film cutting and stress-whitening tends to occur in the film, whereas if the content is more than 30% by weight, the hardness and stiffness of the resultant film tend to deteriorate.

The reduced viscosity of the methyl ethyl ketone-soluble matter in the resin composition (C) used in the present invention is preferably 0.2 to 0.8 dl/g and more preferably 0.2 to 0.7 dl/g. If the reduced viscosity is less than 0.2 dl/g, the elongation at the time of tensile breakage of the resultant film is lowered, cracks are likely to occur at the time of film cutting, and the solvent resistance tends to deteriorate, whereas if the reduced viscosity is more than 0.8 dl/g, the moldability of the film tends to deteriorate.

The process for preparing the acrylic graft copolymer (A) and methacrylic polymer (B) used in the present invention is not particularly limited and, for example, emulsion polymerization, suspension polymerization and bulk polymerization are applicable.

In the emulsion polymerization, a conventional polymerization initiator is used. Concrete examples of such initiators include: inorganic peroxides such as potassium persulfate and sodium persulfate; and organic peroxides such as cumene hydroperoxide and benzoyl peroxide. Oil-soluble initiators such as azobisisobutyronitrile can also be used. These initiators may be used alone or in combination.

These initiators maybe used in combination with a reducing agent, such as sodium sulfite, sodium thiosulfate, sodium formaldehyde, sulfoxylate, ascorbic acid or ferrous sulfate, as a conventional redox initiator.

The surfactant used in the emulsion polymerization is not particularly limited, either, and any conventional surfactant for emulsion polymerization can be used. Examples of such surfactants include: anionic surfactants such as sodium alkylsulfate, sodium alkylsulfonate, sodium alkylbenzenesulfonate, dioctyl sodium sulfosuccinate and sodium laurate; and nonionic surfactants such as reaction products of alkyl phenols and ethylene oxide. These surfactants may be used alone or in combination.

The resin composition can be separated and collected from the polymer latex obtained by the above described copolymerization through the steps of conventional solidification and cleaning or through the treatment by spray drying or freeze-drying.

The resin composition (C) obtained in accordance with the present invention is particularly effective as a film and can be satisfactorily processed by conventional melt extrusion techniques such as inflation or T die extrusion, or calendering, or solvent casting technique. The thickness of the film is suitably about 30 to 500 μm and preferably 50 to 300 μm. Films having more excellent surface properties can be obtained, if necessary, by bringing both sides of the film into contact with a roll or a metal belt, particularly a roll or a metal belt heated to temperatures above glass transition temperature at the time of film molding by using the resin composition (C).

To the resin composition (C) of the present invention, additives for coloring, such as inorganic or organic pigments or dyes, or additives for stabilizing the film against heat or light, such as anti-oxidant, heat stabilizer, ultraviolet absorber or ultraviolet stabilizer, may be added. These additives may be used alone or in combination.

The method of producing laminates using the film of the present invention is not limited to any specific one; however, such laminates are preferably produced by a film insert molding process or film in-molding molding process, like those described in Japanese Patent Publication Nos. 63-6339, 4-9647, Japanese Patent Laid-Open Nos. 7-9484, 8-323934 and 10-279766. Specifically, laminates are produced by: first inserting a film having been shaped in advance by vacuum forming etc. or a film having not been shaped into an injection molding die; closing the injection molding die with the film held between the two parts of the die to clamp the film; and injecting base resin into the molding die, so that the film is molten on the surface of the molded part of the base resin and integrated therewith. In the injection molding, the injection molding conditions such as resin temperature and injection pressure are properly set taking the types of the base resin etc. into consideration.

The base resin that constitutes the acrylic laminates obtained in accordance with the present invention is required to be able to melt and adhere to acrylic film. Examples of such base resins include ABS resin, AS resin, styrene resin, polycarbonate resin, vinyl chloride resin, acrylic resin, polyester resin, and resins containing these resins as a chief ingredient.

EXAMPLES

In the following the present invention will be described by examples and comparative examples; however, it should be understood that these examples are not intended to limit the present invention. The terms "parts" and "%" used in examples and comparative examples mean parts by weight and % by weight, respectively. The abbreviations used represent the following substances.

OSA: dioctyl sodium sulfosuccinate
BA: butyl acrylate
MMA: methyl methacrylate
CHP: cumene hydroperoxide
tDM: tert-dodecyl mercaptan
EA: ethyl acrylate
AMA: allyl methacrylate The characteristics were obtained and the evaluation was made by the following methods under the following conditions. (Average particle size of acrylic ester rubber-like polymer)

A film was subjected to ruthenium staining and observed with a transmission electron microscope. The particle size was measured for 500 particles and the average value of the measurements was obtained (unit: Å).

(Graft Ratio G)

The powder prepared in reference examples was dissolved in methyl ethyl ketone and the insoluble matter was separated from the soluble matter. The insoluble matter was taken as graft polymer and the graft ratio was obtained by the following equation (unit: %):

G=(weight of insoluble matter−weight of rubber-like polymer)/weight of rubber-like polymer×100.

(Reduced Viscosity)

The powder prepared in reference examples was dissolved in methyl ethyl ketone and the insoluble matter was separated from the soluble matter. The soluble matter was dissolved in N,N-dimethyl formamide so that the content of the soluble matter was 0.3% by weight. The viscosity at 30° C. was measured using an Ubbelohde tube (unit: dl/g).

(Tensile Strength, Elongation at the Time of Tensile Breakage)

Film was cut out in JIS dumbbell shape, and the tensile strength and elongation at the time of tensile breakage of the dumbbell specimen were measured with Autograph (Shimadzu) at 23° C. at a tensile speed of 50 mm/min (unit: tensile strength MPa, elongation at the time of tensile breakage %).

(Stress-Whitening)

An operation was performed once at 23° C. in which film (100 μm thick, cut to 210 mm×290 mm) was folded in two and held down firmly with fingers to give it a fold. Then the whitening occurring on the film was observed and evaluated based on the following criteria.
○: No whitening is observed on the fold.
Δ: Opaque white (slight whitening) is observed on part of the fold.
×: Whitening is significant.

(Transparency)

The haze of film was measured in accordance with JIS K 6714 (unit: %).

(Transparency After Heating)

The haze of film was measured in accordance with JIS K 6714 after heating the film at 160° C. for 1 minute, and the difference in haze before and after heating was evaluated based on the following criteria.
○: The difference in haze before and after heating is less than 0.5.
Δ: The difference in haze before and after heating is 0.5 or more and less than 1.0.
×: The difference in haze before and after heating is 1.0 or more.

(Pencil Hardness)

The pencil hardness of film was measured in accordance with JIS K 5400.

(Moldability of Film)

Film molding was performed continuously for 3 hours under the same conditions as those of examples 1 to 17 and comparative examples 1 to 7 and the state of molding was observed (the center portion of film was cut off every 15 minutes to measure the thickness of the film). The moldability was evaluated based on the following criteria.
○: The thickness of film is uniform (100±5 μm) and film can be molded without causing film breakage.
Δ: The thickness of film is almost uniform (100±10 μm) and film can be molded without causing film breakage.
×: The thickness of film is not uniform and film breaks.

(Surface Properties of Film)

The surface of a film 1 m×1 m in size (100 μm thick) was observed and the surface properties were judged by the standards for fish eye, die line and carbonized resin which were used as a base for acceptance of the film.

The standard for fish eye used as a base for acceptance of film is that the number of fish eyes observed is 1000 or less and the term "significant" means that the number of fish eyes observed is 10,000 or more.

The standard for die line used as a base for acceptance of film is that the number of die lines less than 10 cm long is 5 or less and the term "significant" means that die line 1 m or more long is observed.

The standard for carbonized resin used as a base for acceptance of film is that the film is not discolored or the number of carbonized resin observed is 5 or less and the term "significant" means that carbonized resin is obvious and the number of carbonized resin is 50 or more.

○: The surface of film satisfies the standards for all of the above 3 items.

Δ: The surface of film does not satisfy the standard for only one item, but the evaluation for the rejected item is not "significant".

×: The surface of film does not satisfy the standards for two or more of the above 3 items, or it is evaluated as "significant" for any one of the above 3 items.

(Processability of Film)

Film (100 μm thick) was placed on a flat stand and cut to 20 cm in various directions with a cutter knife (with an edge 0.38 mm thick) using force sufficient to cut the film and the processability of the film was evaluated based on the following criteria.

○: No crack was observed.

Δ: Cracks were observed (less than 5 cracks which were 5 mm or less long).

×: Cracks were significantly observed (5 or more cracks which were 5 mm or less long, or at least one crack 5 mm or more long was observed).

Reference Examples 1 to 18

The following substances were fed to an 8 L polymerizer fitted with a stirrer.

| Water | 200 parts |
| OSA | 0.2 parts |
| Disodium ethylenediaminetetraacetate | 0.001 parts |

-continued

| Ferrous sulfate | 0.00025 parts |
| Sodium formaldehydesulfoxylate | 0.15 parts |

After deoxidizing the inside of the polymerizer and heating the same to 60° C., the monomer mixture (a) shown in Table 1 and Table 2 was added dropwise successively at a rate of 10 parts/hour and polymerized for 30 minutes to obtain an acrylic ester rubber-like polymer. The degree of polymerization conversion was 99.5%. Then, after feeding 0.2 parts of OSA, and the monomer mixture (b) shown in Table 1 and Table 2 was added dropwise successively at a rate of 12 parts/hour and polymerized for 1 hour to obtain an acrylic graft copolymer (A) and a methacrylic polymer (B). The resultant latex was salted out and solidified with calcium acetate, rinsed and dried to obtain resin powder. The reduced viscosity and graft ratio of the resin powder were measured. The results are shown in Table 1 and Table 2.

Reference Example 19

A monomer mixture of 92% of MMA and 8% of BA was subjected to emulsion polymerization to prepare a copolymer. The reduced viscosity of the resultant methacrylic ester copolymer was 0.36 dl/g.

Reference Example 20

MMA-EA copolymer (Sumipex EX by Sumitomo Chemical: a copolymer consisting of about 95% of MMA and about 5% of EA, reduced viscosity 0.30 dl/g) prepared by suspension polymerization was used.

TABLE 1

| | | Reference Example | | | | | | | | |
|---|---|---|---|---|---|---|---|---|---|---|
| | | 1 | 2 | 3 | 4 | 5 | 6 | 7 | 8 | 9 |
| OSA (parts) | | 0.20 | 0.24 | 0.18 | 0.28 | 0.35 | 0.20 | 0.15 | 0.05 | 0.20 |
| Monomer | (parts) | 21 | 23 | 23 | 30 | 40 | 14 | 18 | 30 | 23 |
| mixture | BA (%) | 90 | 90 | 90 | 90 | 90 | 98 | 90 | 90 | 90 |
| (a) | MMA (%) | 7.6 | 8.0 | 7.5 | 6.5 | 8.0 | — | 7.0 | 7.5 | 8.6 |
| | AMA (%) | 2.4 | 2.0 | 2.5 | 3.5 | 2.0 | 2.0 | 3.0 | 2.5 | 1.4 |
| | CHP (parts) | 0.06 | 0.08 | 0.08 | 0.09 | 0.12 | 0.05 | 0.05 | 0.09 | 0.06 |
| Monomer | (parts) | 79 | 77 | 77 | 70 | 60 | 86 | 82 | 70 | 77 |
| mixture | BA (%) | 10 | 10 | 10 | 10 | 10 | 10 | 10 | 10 | 10 |
| (b) | MMA (%) | 90 | 90 | 90 | 90 | 90 | 90 | 90 | 90 | 90 |
| | CHP (parts) | 0.30 | 0.30 | 0.30 | 0.30 | 0.30 | 0.30 | 0.30 | 0.30 | 0.30 |
| | tDM (parts) | 0.30 | 0.28 | 0.25 | 0.25 | 0.28 | 0.25 | 0.30 | 0.30 | 0.60 |
| Reduced viscosity | | 0.35 | 0.32 | 0.36 | 0.39 | 0.36 | 0.38 | 0.34 | 0.28 | 0.15 |
| Graft ratio | | 135 | 130 | 120 | 165 | 90 | 110 | 110 | 115 | 28 |

TABLE 2

| | | Reference Example | | | | | | | | |
|---|---|---|---|---|---|---|---|---|---|
| | | 10 | 11 | 12 | 13 | 14 | 15 | 16 | 17 | 18 |
| OSA (parts) | | 0.20 | 0.15 | 0.24 | 0.28 | 0.26 | 0.26 | 0.20 | 0.20 | 0.26 |
| Monomer | (parts) | 16 | 18 | 14 | 30 | 30 | 30 | 16 | 16 | 30 |
| mixture | BA (%) | 90 | 90 | 98 | 90 | 89 | 89 | 90 | 90 | 89 |
| (a) | MMA (%) | 7.6 | 7.4 | — | 7.5 | 8.0 | 7.5 | 9.0 | 8.6 | 8.0 |
| | AMA (%) | 2.4 | 2.6 | 2.0 | 2.5 | 3 | 3.5 | 1.0 | 2.4 | 3.0 |
| | CHP (parts) | 0.06 | 0.06 | 0.05 | 0.09 | 0.09 | 0.09 | 0.06 | 0.06 | 0.09 |
| Monomer | (parts) | 84 | 82 | 86 | 70 | 70 | 70 | 84 | 84 | 70 |

TABLE 2-continued

|  |  | Reference Example | | | | | | | | |
|---|---|---|---|---|---|---|---|---|---|---|
|  |  | 10 | 11 | 12 | 13 | 14 | 15 | 16 | 17 | 18 |
| mixture (b) | BA (%) | 10 | 10 | 10 | 10 | 8 | 8 | 10 | 10 | 8 |
|  | MMA (%) | 90 | 90 | 90 | 90 | 92 | 92 | 90 | 90 | 92 |
|  | CHP (parts) | 0.30 | 0.30 | 0.30 | 0.30 | 0.30 | 0.30 | 0.30 | 0.30 | 0.30 |
|  | tDM (parts) | 0.28 | 0.30 | 0.25 | 0.25 | 0.25 | 0.25 | 0.28 | 0.60 | 0.30 |
|  | Reduced viscosity | 0.35 | 0.32 | 0.38 | 0.32 | 0.39 | 0.39 | 0.34 | 0.15 | 0.33 |
|  | Graft ratio | 135 | 140 | 125 | 120 | 150 | 165 | 110 | 28 | 125 |

Examples 1 to 17 and Comparative Examples 1 to 7

Film was prepared in the following procedures using resin powders obtained in reference examples 1 to 20.

1.5 parts of TINUVIN 1577 (Ciba Specialty Chemicals Inc.) as a UV absorber and 0.3 parts of Sumilizer GM (Sumitomo Chemical) as an antioxidant were mixed into 100 parts of the resin composition of the formulation shown in Table 3 and Table 4 and extruded with a vented extruder at 220° C. to obtain extruded pellets. The resultant pellets were molded with a T-die extruder at die temperature of 240° C. to obtain film 100 μm thick. Various physical properties were evaluated using this film. The results are shown in Table 3 and Table 4.

TABLE 3

|  |  | Examples | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Resin composition | Reference example 1 | 100 | | | | | | | | | | | | |
|  | Reference example 2 | | 100 | | | | | | | | | | | |
|  | Reference example 3 | | | 100 | | | | | | | | | | |
|  | Reference example 4 | | | | 70 | 80 | | | | | | | | |
|  | Reference example 5 | | | | | | 60 | | | | | | | |
|  | Reference example 6 | | | | | | | 100 | | | | | | |
|  | Reference example 7 | | | | | | | | 100 | | | | | |
|  | Reference example 8 | | | | | | | | | | | | | |
|  | Reference example 9 | | | | | | | | | | | | | |
|  | Reference example 10 | | | | | | | | | 100 | | | | |
|  | Reference example 11 | | | | | | | | | | 100 | | | |
|  | Reference example 12 | | | | | | | | | | | 100 | | |
|  | Reference example 13 | | | | | | | | | | | | 60 | 50 |
|  | Reference example 14 | | | | | | | | | | | | | |
|  | Reference example 15 | | | | | | | | | | | | | |
|  | Reference example 16 | | | | | | | | | | | | | |
|  | Reference example 17 | | | | | | | | | | | | | |
|  | Reference example 18 | | | | | | | | | | | | | |
|  | Reference example 19 | | | | | 20 | | | | | | | | 50 |
|  | Reference example 20 | | | | 30 | | 40 | | | | | | 40 | |
| Average particle size (Å) of rubber-like polymer | | 800 | 600 | 1200 | 780 | 780 | 800 | 800 | 800 | 800 | 1200 | 600 | 780 | 780 |
| Amount of crosslinking agent (parts) | | 2.4 | 2.0 | 2.5 | 3.5 | 3.5 | 2.0 | 2.0 | 3.0 | 2.4 | 2.6 | 2.0 | 2.5 | 2.5 |

TABLE 3-continued

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Content of rubber-like polymer (%) | 21 | 23 | 23 | 21 | 24 | 24 | 14 | 18 | 16 | 18 | 14 | 18 | 15 |
| Graft ratio (%) | 135 | 130 | 120 | 165 | 165 | 90 | 110 | 110 | 135 | 140 | 125 | 120 | 120 |
| Reduced viscosity (dl/g) | 0.35 | 0.32 | 0.36 | 0.39 | 0.37 | 0.36 | 0.38 | 0.34 | 0.35 | 0.32 | 0.38 | 0.31 | 0.34 |
| Tensile strength (MPa) | 55 | 57 | 54 | 60 | 50 | 51 | 76 | 63 | 65 | 61 | 71 | 62 | 68 |
| Elongation at the time of tensile breakage (%) | 100 | 90 | 120 | 100 | 120 | 100 | 50 | 70 | 70 | 80 | 60 | 65 | 60 |
| Stress-whitening | ○ | ○ | ○ | ○ | ○ | ○ | ○ | ○ | ○ | Δ | ○ | ○ | ○ |
| Transparency (haze) (%) | 0.6 | 0.4 | 0.9 | 0.6 | 0.6 | 0.8 | 0.3 | 0.5 | 0.3 | 0.6 | 0.3 | 0.4 | 0.3 |
| Transparency after heating | ○ | ○ | ○ | ○ | ○ | ○ | ○ | ○ | ○ | ○ | ○ | ○ | ○ |
| Pencil hardness | H | H | H | H | H | H | 2H | H | H | H | 2H | H | H |
| Moldability of film | ○ | ○ | ○ | ○ | ○ | ○ | ○ | ○ | ○ | ○ | ○ | ○ | ○ |
| Surface properties of film | ○ | ○ | ○ | ○ | ○ | ○ | ○ | ○ | ○ | ○ | ○ | ○ | ○ |
| Processability of film | ○ | ○ | ○ | ○ | ○ | ○ | Δ | Δ | Δ | ○ | Δ | ○ | ○ |

TABLE 4

| | | Examples | | | | Comparative examples | | | | | | |
|---|---|---|---|---|---|---|---|---|---|---|---|---|
| | | 14 | 15 | 16 | 17 | 1 | 2 | 3 | 4 | 5 | 6 | 7 |
| Resin composition | Reference example 1 | | | | | | | | | | | |
| | Reference example 2 | | | | | | | | | | | |
| | Reference example 3 | | | | | | | | | | | |
| | Reference example 4 | | | | | | | | | | | |
| | Reference example 5 | | | | | | | 100 | | | | |
| | Reference example 6 | | | | | | | | | | | |
| | Reference example 7 | | | | | | | | | | | |
| | Reference example 8 | | | | | 70 | | | | 60 | 10 | |
| | Reference example 9 | | | | | | 100 | | | | | |
| | Reference example 10 | | | | | | | | | | | |
| | Reference example 11 | | | | | | | | | | | |
| | Reference example 12 | | | | | | | | | | | |
| | Reference example 13 | | | 100 | | | | | | | | |
| | Reference example 14 | 60 | | | | | | | | | | |
| | Reference example 15 | | 60 | | | | | | | | | |
| | Reference example 16 | | | | | | | | | 100 | | |
| | Reference example 17 | | | | | | | | | | 100 | |
| | Reference example 18 | | | | 60 | | | | | | | |
| | Reference example 19 | 40 | 40 | | | | | | | 90 | | |
| | Reference example 20 | | | 40 | 30 | | | | | 40 | | |

TABLE 4-continued

|  | Examples | | | | Comparative examples | | | | | | |
| --- | --- | --- | --- | --- | --- | --- | --- | --- | --- | --- | --- |
|  | 14 | 15 | 16 | 17 | 1 | 2 | 3 | 4 | 5 | 6 | 7 |
| Average particle size (Å) of rubber-like polymer | 800 | 800 | 780 | 780 | 2500 | 800 | 800 | 800 | 2500 | 2500 | 810 |
| Amount of crosslinking agent (parts) | 3.0 | 3.5 | 2.5 | 3.0 | 2.5 | 1.4 | 2.0 | 1.0 | 2.5 | 2.5 | 2.4 |
| Content of rubber-like polymer (%) | 18 | 18 | 30 | 18 | 21 | 23 | 40 | 16 | 18 | 3 | 16 |
| Graft ratio (%) | 150 | 165 | 90 | 125 | 115 | 28 | 90 | 110 | 115 | 115 | 28 |
| Reduced viscosity (dl/g) | 0.39 | 0.39 | 0.32 | 0.32 | 0.28 | 0.15 | 0.36 | 0.33 | 0.29 | 0.35 | 0.15 |
| Tensile strength (MPa) | 62 | 61 | 32 | 62 | 48 | 25 | 35 | 58 | 54 | 80 | 28 |
| Elongation at the time of tensile breakage (%) | 65 | 65 | 100 | 20 | 50 | 5 | 150 | 60 | 50 | 5 | 1 |
| Stress-whitening | ○ | ○ | ○ | ○ | x | x | ○ | x | x | x | x |
| Transparency (haze) (%) | 0.3 | 0.3 | 0.9 | 0.6 | 2.5 | 1.2 | 1.5 | 0.8 | 2.3 | 3.5 | 2.9 |
| Transparency after heating | ○ | ○ | ○ | ○ | x | x | Δ | Δ | x | Δ | x |
| Pencil hardness | H | H | B | H | H | H | 3B | H | H | 3H | HB |
| Moldability of film | ○ | ○ | ○ | ○ | ○ | x | ○ | ○ | ○ | x | x |
| Surface properties of film | ○ | ○ | Δ | ○ | ○ | x | ○ | Δ | ○ | Δ | x |
| Processability of film | ○ | ○ | ○ | ○ | ○ | x | ○ | ○ | Δ | x | x |

Reference Examples 21 to 28

The following substances were fed to an 8 L polymerizer fitted with a stirrer.

| | |
| --- | --- |
| Water | 200 parts |
| OSA | 0.2 parts |
| Disodium ethylenediaminetetraacetate | 0.001 parts |
| Ferrous sulfate | 0.00025 parts |
| Sodium formaldehydesulfoxylate | 0.15 parts |

After deoxidizing the inside of the polymerizer and heating the same to 60° C., the monomer mixture (a) shown in Table 5 was added dropwise successively at a rate of 10 parts/hour and polymerized for 30 minutes to obtain an acrylic ester rubber-like polymer. The degree of polymerization conversion was 99.5%. Then, after feeding 0.2 parts of OSA, and the monomer mixture (b) shown in Table 5 was added dropwise successively at a rate of 12 parts/hour in first and second steps and polymerized for 1 hour to obtain an acrylic graft copolymer (A) and a methacrylic polymer (B). The resultant latex was salted out and solidified with calcium acetate, rinsed and dried to obtain resin powder. The reduced viscosity and graft ratio of the resin powder were measured. The results are shown in Table 5.

TABLE 5

| | | Reference examples | | | | | | | |
| --- | --- | --- | --- | --- | --- | --- | --- | --- | --- |
| | | 21 | 22 | 23 | 24 | 25 | 26 | 27 | 28 |
| | OSA (parts) | 0.20 | 0.26 | 0.24 | 0.26 | 0.15 | 0.20 | 0.05 | 0.20 |
| Monomer mixture (a) | (parts) | 18 | 30 | 16 | 30 | 30 | 16 | 30 | 16 |
| | BA (%) | 90 | 90 | 97 | 96.2 | 89 | 90 | 90 | 90 |
| | MMA (%) | 7.4 | 7.5 | — | — | 8 | 9 | 7.5 | 8.6 |
| | AMA (%) | 2.6 | 2.5 | 3.0 | 3.8 | 3.0 | 1.0 | 2.5 | 1.4 |
| | CHP (parts) | 0.06 | 0.09 | 0.05 | 0.09 | 0.09 | 0.05 | 0.09 | 0.06 |
| Monomer mixture (b) | First step (parts) | 42 | 40 | 50 | 35 | 30 | 54 | 35 | 44 |
| | BA (%) | 12 | 10 | 10 | 10 | 8 | 20 | 10 | 10 |
| | MMA (%) | 88 | 90 | 90 | 90 | 92 | 80 | 90 | 90 |
| | CHP (parts) | 0.15 | 0.15 | 0.21 | 0.15 | 0.13 | 0.15 | 0.15 | 0.15 |
| | tDM (parts) | 0.15 | 0.13 | 0.21 | 0.15 | 0.11 | 0.18 | 0.16 | 0.30 |
| | Second step (parts) | 40 | 30 | 20 | 35 | 40 | 30 | 35 | 40 |
| | BA (%) | 17 | 20 | 20 | 20 | 30 | 10 | 20 | 20 |
| | MMA (%) | 83 | 80 | 80 | 80 | 70 | 90 | 80 | 80 |
| | CHP (parts) | 0.15 | 0.15 | 0.09 | 0.15 | 0.17 | 0.15 | 0.15 | 0.30 |
| | tDM (parts) | 0.15 | 0.12 | 0.09 | 0.15 | 0.14 | 0.10 | 0.16 | 0.15 |
| | Reduced viscosity | 0.35 | 0.39 | 0.30 | 0.32 | 0.39 | 0.34 | 0.28 | 0.15 |
| | Graft ratio | 135 | 145 | 140 | 120 | 150 | 110 | 115 | 28 |

Examples 18 to 24 and Comparative Examples 8 to 10

Film was prepared using each of the resin powders obtained in reference examples 19 to28 through the following procedure.

1.5 parts of TINUVIN 1577 (Ciba Specialty Chemicals Inc.) as a UV absorber and 0.3 parts of Sumilizer GM (Sumitomo Chemical) as an antioxidant were mixed into 100 parts of the resin composition of the formulation shown in Table 6 and extruded with a vented extruder at 220° C. to obtain extruded pellets. The resultant pellets were molded with a T-die extruder at die temperature of 240° C. to obtain film 100 μm thick. Various physical properties were evaluated using this film. The results are shown in Table 6.

the time of tensile breakage is high, and whose moldability, surface properties and processability (cracks are less likely to occur at the time of film cutting) are all excellent.

The invention claimed is:

1. An acrylic film, composed of a resin composition (C) that comprises an acrylic graft copolymer (A) containing an acrylic ester rubber polymer and a methacrylic polymer (B) containing 80% by weight or more of methyl methacrylate, wherein
   (1) the content of the acrylic ester rubber polymer in the resin composition (C) is 5% by weight or more and 30% by weight or less,
   (2) the average particle size of the acrylic ester rubber polymer is 500 to 2000 Å,

TABLE 6

| | | Examples | | | | | | | Comparative examples | | |
|---|---|---|---|---|---|---|---|---|---|---|---|
| | | 18 | 19 | 20 | 21 | 22 | 23 | 24 | 8 | 9 | 10 |
| Resin composition | Reference example 19 | | | | | | 50 | | | 90 | |
| | Reference example 20 | | 40 | | 40 | 30 | | | | | |
| | Reference example 21 | 100 | | | | | | | | | |
| | Reference example 22 | | 60 | | | | | 100 | | | |
| | Reference example 23 | | | 100 | | | | | | | |
| | Reference example 24 | | | | 60 | | 50 | | | | |
| | Reference example 25 | | | | | 70 | | | | | |
| | Reference example 26 | | | | | | | | 100 | | |
| | Reference example 27 | | | | | | | | | 10 | |
| | Reference example 28 | | | | | | | | | | 100 |
| Average particle size (Å) of rubber-like polymer | | 800 | 780 | 600 | 780 | 1200 | 780 | 780 | 800 | 2500 | 800 |
| Amount of crosslinking agent (parts) | | 2.6 | 2.5 | 3.0 | 3.8 | 3.0 | 3.8 | 2.5 | 1.0 | 2.5 | 1.4 |
| Content of rubber-like polymer (%) | | 18 | 18 | 16 | 18 | 21 | 15 | 30 | 16 | 3 | 16 |
| Graft ratio (%) | | 135 | 145 | 140 | 120 | 150 | 120 | 145 | 110 | 115 | 28 |
| Reduced viscosity (dl/g) | | 0.35 | 0.35 | 0.30 | 0.31 | 0.37 | 0.34 | 0.39 | 0.34 | 0.35 | 0.15 |
| Tensile strength (MPa) | | 61 | 63 | 65 | 62 | 55 | 67 | 32 | 70 | 85 | 68 |
| Elongation at the time of tensile breakage (%) | | 70 | 68 | 90 | 100 | 110 | 95 | 110 | 50 | 15 | 10 |
| Stress-whitening | | ○ | ○ | ○ | ○ | ○ | ○ | ○ | x | x | x |
| Transparency (haze) (%) | | 0.6 | 0.5 | 0.4 | 0.6 | 0.8 | 0.5 | 0.9 | 0.8 | 3.5 | 2.6 |
| Transparency after heating | | ○ | ○ | ○ | ○ | ○ | ○ | ○ | Δ | x | x |
| Pencil hardness | | H | H | H | H | F | 2H | 2B | H | 3H | HB |
| Moldability of film | | ○ | ○ | ○ | ○ | ○ | ○ | ○ | ○ | Δ | x |
| Surface properties of film | | ○ | ○ | ○ | ○ | ○ | ○ | Δ | Δ | x | x |
| Processability of film | | ○ | ○ | ○ | ○ | ○ | ○ | ○ | ○ | x | x |

INDUSTRIAL APPLICABILITY

According to the present invention, a film can be obtained which undergoes less stress-whitening even by molding at low temperatures, which has high surface hardness, excellent transparency, also excellent transparency even after heating and excellent weatherability, whose elongation at (3) the relationship between the average particle size d (Å) of the acrylic ester rubber polymer and the amount w (% by weight) of a cross-linking agent used in the acrylic ester rubber polymer satisfies the following equation:

$$0.0025d \leq w \leq 0.0045d,$$

(4) the graft ratio of the acrylic graft copolymer (A) is 30% or more and 200% or less, and (5) the reduced viscosity of methyl ethyl ketone soluble matter in the resin composition (C) is 0.2 to 0.8 dl/g.

2. The acrylic film according to claim 1, wherein the content of the acrylic ester rubber polymer in the resin composition (C) is 15% by weight or more and 30% by weight or less.

3. The acrylic film according to claim 1, wherein the content of the acrylic ester rubber polymer in the resin composition (C) is more than 20% by weight and 30% by weight or less.

4. The acrylic film according to claim 1, wherein the acrylic graft copolymer (A) is prepared by: graft polymerizing a monomer mixture containing 86% by weight or more of a methacrylic ester onto the acrylic ester rubber polymer in a first step; and graft polymerizing a monomer mixture containing 85% by weight or less of a methacrylic ester onto the resultant graft polymer in a second step.

5. A laminate containing the acrylic film according to claim 1.

6. The laminate according to claim 5, produced by injection molding.

* * * * *